United States Patent [19]

Ameyama et al.

[11] Patent Number: 4,673,955

[45] Date of Patent: Jun. 16, 1987

[54] INK RECEPTACLE FOR INK JET PRINTER

[75] Inventors: Minoru Ameyama, Yokohama; Takuro Isayama; Hiroshi Yamazaki, both of Tokyo; Shuzo Matsumoto; Yasuo Katano, both of Yokohama; Kyuhachiro Iwasaki, Fujisawa, all of Japan

[73] Assignee: Ricoh Company, Ltd., Tokyo, Japan

[21] Appl. No.: 870,529

[22] Filed: Jun. 4, 1986

[30] Foreign Application Priority Data

Jun. 4, 1985 [JP] Japan ............................... 60-121185

[51] Int. Cl.[4] ............................................ G01D 15/16

[52] U.S. Cl. ................................................ 346/140 R

[58] Field of Search .................................. 346/140, 75

[56] References Cited

U.S. PATENT DOCUMENTS 4,589,000 5/1986 Koto .................................. 346/140

4,604,633 8/1986 Kimura .............................. 346/140

*Primary Examiner*—Joseph W. Hartary

*Attorney, Agent, or Firm*—Oblon, Fisher, Spivak, McClelland & Maier

[57] ABSTRACT

An ink receptacle for an on-demand type ink jet printer in which an ink reservoir for storing ink which is to be ejected from an ink jet head is mounted on a carriage. A relatively thick flat housing which is made of non-flexible resin and open at one surface and a single flexible film are bonded together, the film covering the open side of the housing. The housing and the film cooperate to define a relatively large first ink chamber having an opening which is open to the outside and a relatively small second ink chamber also having an opening which is open to the outside. That part of the film which covers the first chamber is deformable to vary the volume of the first chamber corresponding to an amount of ink remaining in the chamber.

15 Claims, 8 Drawing Figures

INK RECEPTACLE FOR INK JET PRINTER

BACKGROUND OF THE INVENTION

The present invention relates to an ink receptacle for an ink on-demand type ink jet printer in which an ink reservoir of an ink jet head is mounted on a carriage.

Well known in the printing art is an ink jet printer of the type in which an ink jet head is mounted on a carriage and, while the carriage is moved relative to a paper, ink drops are ejected from the ink jet head to print out data on the paper. For example, Japanese Unexamined Patent Publication (Kokai) No. 57-18265 discloses an ink jet printer having a first reservoir, or tank, which is mounted in a stationary portion of the printer and a second reservoir, or tank, which is mounted on a carriage. The first and second ink reservoirs are fluidly communicated to each other by a flexible tube. Although such a prior art printer allows the total reservoir volume to be increased, it brings about various problems such as slipping out of the flexible tube and leakage of ink at the interconnected portions, while requiring an extra space for the movement of the tube. Meanwhile, Japanese Unexamined Patent Publication (Kokai) No. 58-147372 describes an ink jet printer which eliminates the need for the flexible tube by mounting an ink reservoir (cartridge) and an ink jet head on a carriage. The problem with this tube-less scheme is that it needs an opening for drawing the same amount of air as ink consumed into the reservoir, the opening inviting leakage of ink due to vibration and evaporation of ink. These problems may be solved by an implementation wherein the reservoir (cartridge) is constructed by use of a flexible film, as disclosed in Japanese Unexamined Patent Publication (Kokai) No. 52-110633. Nevertheless, unless extra structures such as a damping structure are built in the head, the film type scheme fails to prevent data from being printed out with high quality because the pressure inside the tank is variable responsive to reciprocation of the carriage.

As discussed above, prior art ink on-demand printers of the type having an ink reservoir mounted on a carriage have a drawback that pressure variations due to reciprocation of a carriage cannot be prevented unless the volume of ink is severely restricted or the tank is provided with a complicated structure.

SUMMARY OF THE INVENTION

It is therefore an object of the present invention to provide an ink receptacle for an ink jet printer which is simple in construction and cost-effective while accommodating a large amount of ink.

It is another object of the present invention to provide a generally improved ink receptacle for an ink jet printer.

An ink receptacle for an on-demand type ink jet printer in which an ink reservoir for storing ink which is to be ejected from an ink jet head is mounted on a carriage of the present invention comprises a non-flexible housing made of resin and having a relatively large first ink chamber which stores ink therein and includes an opening which is exposed to outside, a relatively small second ink chamber having an opening which is exposed to outside, a first ink supply channel communicating the first and second ink chambers to each other to supply the ink from the first chamber to the second chamber, and a second ink supply channel communicating the second ink chamber to the head to supply the ink from the second chamber to the head. At least one flexible film is bonded to the housing to cover the openings of the first and second ink chambers to thereby separate the first and second ink chambers from each other, that part of the flexible flim which covers the first chamber being deformable corresponding to an amount of remaining ink. A filter is situated between the first ink chamber and the first ink supply channel.

The filter may be replaced with a narrow tubular configuration of the first ink supply channel.

The above and other objects, features and advantages of the present invention will become more apparent from the following detailed description taken with the accompanying drawings.

DESCRIPTION OF THE PREFERRED EMBODIMENTS

While the ink receptacle for an ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
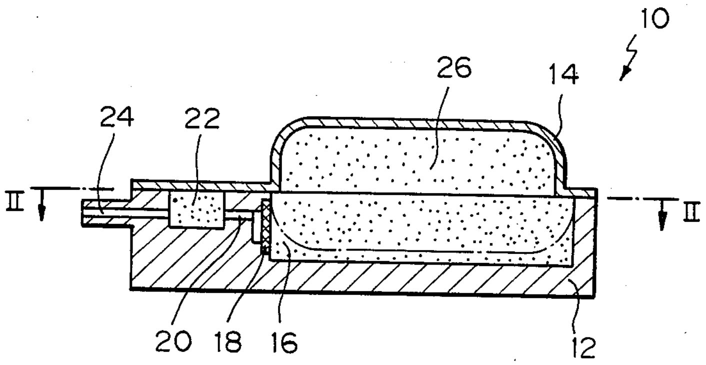
FIG. 1 is a section showing an ink receptacle for an ink jet printer embodying the present invention.
Figure 2:
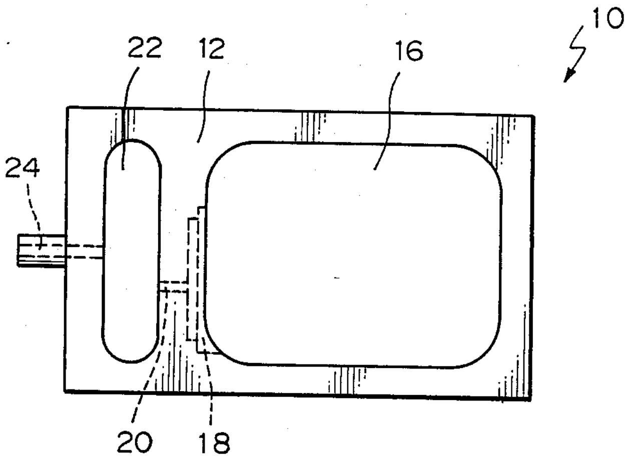
FIG. 2 is a section along line II—II of FIG. 1.

Referring to FIGS. 1 and 2 of the drawings, an ink receptacle embodying the present invention is shown and generally designated by the reference numeral 10. As shown, the receptacle 10 comprises a housing 12 made of resin, a flexible film 14, a first ink chamber 16 defined by the housing 12 and film 14, a filter 18, a first ink supply channel 20, a second ink chamber 22 also defined by the housing 12 and film 14, and a second ink supply channel 24. The receptacle 12 and the film 14 are bonded together as illustrated to define the first ink chamber 22. Deaerated ink 26 is accommodated in the ink chamber 22. The film 14 is produced by, for example, vacuum forming so that it may be freely deformable in concave and convex configurations corresponding to an amount of ink 26 remaining in the ink chamber 16. Specifically, while the amount of ink 26 in the ink chamber 16 is relatively large, the film 14 protrudes to the outside of the ink chamber 16 as represented by a solid line in FIG. 1; while it is relatively small, the film 14 protrudes into the ink chamber 16 as represented by a phantom line. The film 14 is a laminate film which includes a layer of air permeation resisting material. Preferably, the interengaging surfaces of the film 14 and receptacle 12 are made of the same material, e.g. plyethylene. Bonding of the film 14 and the receptacle may readily be implemented with supersonic deposition or heat sealing, for example.

The use of deaerated ink 26 is effective to prevent bubbles from being produced inside an ink jet head, not shown, while the use of a laminate film which includes a layer of air permeation resisting material as stated above insures the deaerated condition of the ink for a long time. Even if bubbles are produced in the ink 26 inside the first ink chamber 16 after a long time of storage, they are effectively trapped by the filter 18 which is situated in a lower portion of the chamber 16 and thereby prevented from being admitted into the ink jet head together with the ink 26. Furthermore, because the open ends of the first and second ink chambers 16 and 22 are flush with each other, the two chambers can be hermetically closed by the same film and by the same bonding process.

The film section which covers the second ink chamber 22 may be positioned perpendicularly to a predetermined scanning direction of the carriage while the chamber 22 itself may be formed relatively shallow. Such would allow a minimum of pressure variation to occur in the chamber 22 despite the reciprocation of the carriage and, at the same time, cause pressure variation occurred in the first chamber 16 to be absorbed by the flexibility of the film 14 which covers the chamber 22. This effect would be doubled if the effective area and mesh of the filter 18 were selected such that the filter 18 exerts adequate resistance to the fluid. Alternatively, the fluid resistance may be set up by adequately selecting the diameter and length of the first ink supply channel 20. The ink which is admitted into the second chamber 22 as described is routed to the ink jet head by way of the second ink supply channel 24.

Figure 3:
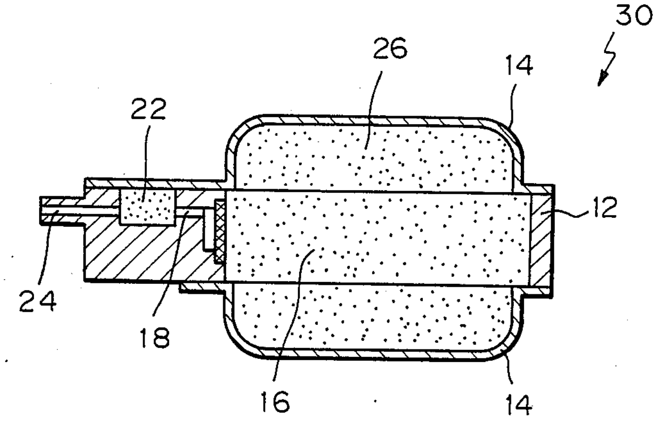
FIGS. 3 and 4 are sections each showing a modification to the receptacle of FIGS. 1 and 2.
Figure 4:
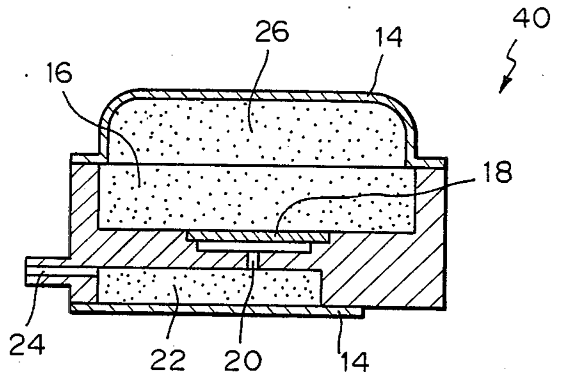

Referring to FIGS. 3 and 4, other embodiments of the present invention are shown. In FIGS. 3 and 4, the same or similar structural elements as those shown in FIGS. 1 and 2 are designated by like reference numerals. In FIG. 3, an ink receptacle 30 is shown which is constructed and arranged to increase the volume of ink which can be accommodated in the receptacle. In FIG. 4, an ink receptacle 40 is shown which is designed to facilitate mounting of the filter 18. The advantage attainable with the receptacle 40 is that a mold for molding the housing 12 is simplified in structure.

Figure 5:
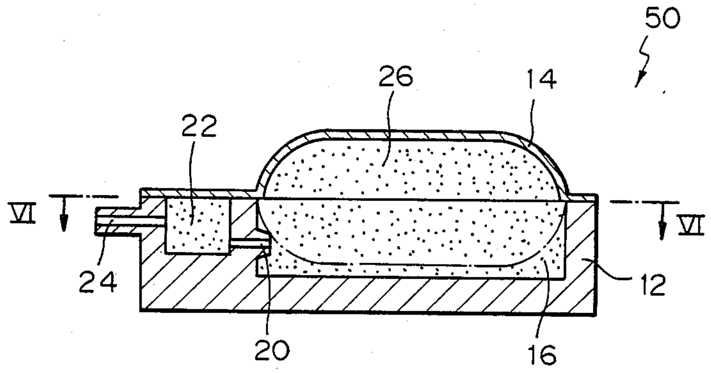
FIG. 5 is a section showing another embodiment of the present invention.
Figure 6:
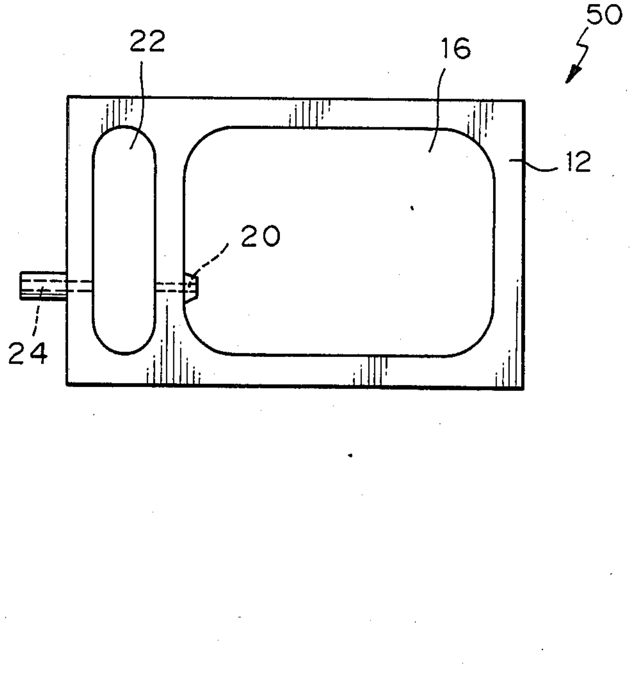
FIG. 6 is a section along line VI—VI of FIG. 5.

Referring to FIGS. 5 and 6, another embodiment of the present invention is shown. Again, the same or similar structural elements as those of FIGS. 1 and 2 are designated by like reference numerals. In this particular embodiment, an ink receptacle, generally 50, elminates the need for the filter 18 which is essential in the embodiment of FIGS. 1 and 2. Specifically, the first ink supply channel 20 of the receptacle 50 is reduced in diameter at the tip thereof so that when bubbles are produced in the first chamber 16 during the course of a long time of storage, they are prevented from being propagated into the second chamber 22 through the first channel 20. The tip of the second channel 24 may be located in the vicinity of a lower portion of the first chamber 16 in order to surely block the bubbles which tend to be admitted into the second chamber 22. Further, the tip of the second channel 24 may be directed upwardly so that the bubbles developed in the first chamber 16 may be even more positively prevented from advancing from the first chamber 16 toward the head. This particular embodiment, therefore, makes it needless to install a filter or like air trap in an ink receptacle and, thereby, promotes the freedom of arrangement of the second chamber 22 while cutting down the dimensions of the whole apparatus. In addition, the diameter and length of the first channel 20 may be selected such that the channel 20 constitutes resistance to the fluid so as to further enhance the air trapping effect.

Figure 7:
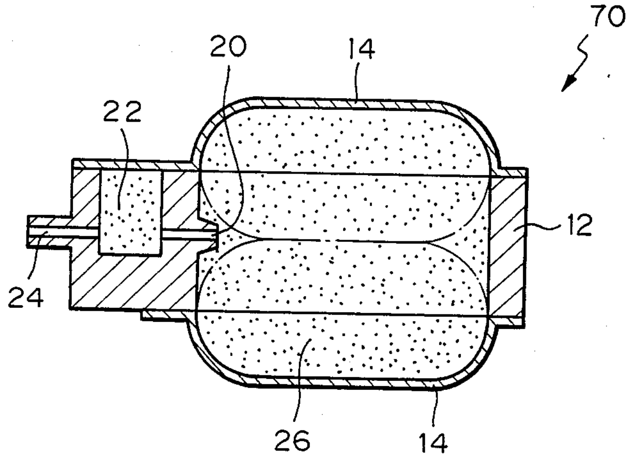
FIGS. 7 and 8 are sections showing modifications to the receptacle of FIGS. 5 and 6.
Figure 8:
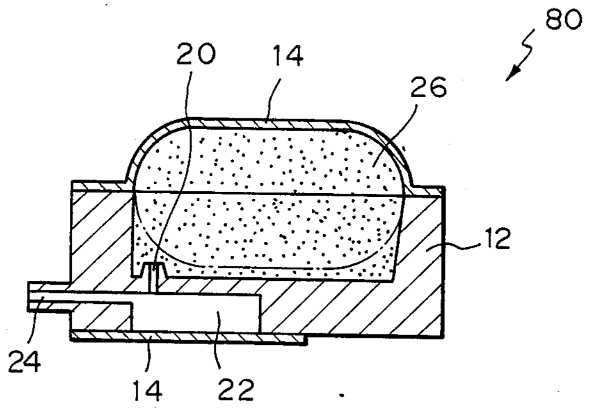

Referring to FIGS. 7 and 8, modifications to the embodiment of FIGS. 5 and 6 are shown. In FIG. 7, an ink receptacle 70 is constructed and arranged to increase the volume of ink which can be accommodated. In FIG. 8, an ink receptacle 80 is elaborated to simplify the structure of a mold adapted to mold the housing 12 or to allow the housing 12 to be easily produced even by processes other than molding. In FIGS. 7 and 8, the same or similar structural elements as those shown in FIGS. 5 and 6 are designated by like reference numerals.

In summary, it will be seen that the present invention provides an ink receptacle for an ink jet printer which achieves various advantages as enumerated below:

(1) By use of deaerated ink and a flexible film resistive to air permeability, bubbles are prevented from being produced inside the receptacle;

(2) Bubbles, if produced, are trapped by a filter;

(3) A second ink chamber serves to damp pressure variations caused by vibration during reciprocation of a carriage;

(4) The receptacle is very inexpensive and this, coupled with cost reduction derived from the use of a molded head, realizes a disposable on-demand head having a receptacle integrally therewith;

(5) Bubbles, if produced, are prevented from being communicated to an ink jet head by the tip of a first ink supply channel which may be reduced in diameter, situated at a low level, and/or directed upwardly; and (6) The fluid resistance exerted by the first ink supply channel and the flexibility of a film, which covers a second ink chamber, serve to damp pressure variations due to the previously mentioned vibration.

Various modifications will become possible for those skilled in the art after receiving the teachings of the present disclosure without departing from the scope thereof.

What is claimed is:

1. An ink receptacle for an on-demand type ink jet printer in which an ink reservoir for storing ink which is to be ejected from an ink jet head is mounted on a carriage, comprising:

a non-flexible housing made of resin and having a relatively large first ink chamber which stores ink therein and includes an opening which is exposed to outside, a relatively small second ink chamber having an opening which is exposed to outside, a first ink supply channel communicating said first and second ink chambers to each other to supply the ink from said first ink chamber to said second ink chamber, and a second ink supply channel communicating said second ink chamber to the head to supply the ink from said second ink chamber to the head;

at least one flexible film bonded to said housing to cover said openings of said first and second ink chambers to thereby separate said first and second ink chambers from each other, the part of said flexible film which covers said first ink chamber being deformable corresponding to an amount of remaining ink; and a filter situated between said first ink chamber and said first ink supply channel.

2. An ink receptacle as claimed in claim 1, wherein the ink comprises deaerated ink.

3. An ink receptacle as claimed in claim 1, wherein a plane in which said part of said film which covers said second ink chamber is positioned is perpendicular to a predetermined direction in which the carriage is movable.

4. An ink receptacle as claimed in claim 1, wherein said second ink supply channel and said filter are communicated to a lower portion of said first ink chamber.

5. An ink receptacle as claimed in claim 1, wherein said film comprises a laminate film which includes a layer of air permeation resisting material.

6. An ink receptacle as claimed in claim 1, wherein a surface of said film and a surface of said housing which are bonded to each other are made of a same material.

7. An ink receptacle as claimed in claim 1, wherein the head and the ink reservoir are constructed integrally with each other and replaceable simultaneously when the ink is consumed.

8. An ink receptacle as claimed in claim 1, wherein said openings of said first and second ink chambers are open in a same direction.

9. An ink receptacle for an on-demand type ink jet printer in which an ink reservoir for storing ink which is to be ejected from an ink jet head is mounted on a carriage, comprising:

a non-flexible housing made of resin and having a relatively large first ink chamber which stores ink therein and includes an opening which is exposed to outside, a relatively small second ink chamber having an opening which is exposed to outside, a first ink supply channel communicating said first and second ink chambers to each other to supply the ink from said first ink chamber to said second ink chamber, and a second ink supply channel communicating said second ink chamber to the head to supply the ink from said second ink chamber to the head; and at least one flexible film bonded to said housing to cover said openings of said first and second ink chambers to thereby separate said first and second ink chambers from each other, that part of said flexible film which covers said first ink chamber being deformable corresponding to an amount of remaining ink;

said first ink supply channel being formed in a narrow tubular configuration.

10. An ink receptacle as claimed in claim 9, wherein the ink comprises deaerated ink.

11. An ink receptacle as claimed in claim 9, wherein a plane in which that part of said film which covers said second ink chamber is positioned is perpendicular to a predetermined direction in which the carriage is movable.

12. An ink receptacle as claimed in claim 9, wherein said film comprises a laminate film which includes a layer of air permeation resisting material.

13. An ink receptacle as claimed in claim 9, wherein a surface of said film and a surface of said housing which are bonded to each other are made of a same material.

14. An ink receptacle as claimed in claim 9, wherein the head and the ink reservoir are constructed integrally with each other and replaceable simultaneously when the ink is consumed.

15. An ink receptacle as claimed in claim 9, wherein said openings of said first and second ink chambers are open in a same direction.

* * * * *